United States Patent [19]

Karpenko

[11] 4,353,390

[45] Oct. 12, 1982

[54] SWING CHECK VALVE WITH INTERNALLY BALANCED DISC

[75] Inventor: Anatole N. Karpenko, San Francisco, Calif.

[73] Assignee: Anchor/Darling Valve Company, San Mateo, Calif.

[21] Appl. No.: 244,330

[22] Filed: Mar. 16, 1981

Related U.S. Application Data

[63] Continuation-in-part of Ser. No. 100,721, Dec. 6, 1979, abandoned.

[51] Int. Cl.³ .................... F16K 15/18; F16K 31/44; F16K 15/00
[52] U.S. Cl. .................................. 137/527.8; 137/554; 251/82; 251/77; 251/63.4; 251/62
[58] Field of Search ................ 137/527, 527.8, 519, 137/554; 251/14, 62, 63.4, 77, 82

[56] References Cited

U.S. PATENT DOCUMENTS

| | | | |
|---|---|---|---|
| 1,463,103 | 7/1923 | Thorsten | 137/527.8 |
| 2,048,088 | 7/1936 | Wagner | 137/527.8 |
| 2,900,998 | 8/1959 | Lortz | 137/527.8 |
| 3,106,220 | 10/1963 | Hose | 251/82 |
| 3,448,759 | 6/1969 | Peerman | 137/527.8 |
| 3,532,320 | 10/1970 | Fisch | 251/62 |
| 3,883,111 | 5/1975 | Jourdan | 251/82 |
| 3,972,504 | 8/1976 | Di Sabatino et al. | 251/82 |
| 4,029,290 | 6/1977 | Karpenko | 137/527.8 |

Primary Examiner—Alan Cohan
Assistant Examiner—John A. Rivell
Attorney, Agent, or Firm—Robert G. Slick

[57] ABSTRACT

A check valve construction is provided which is free of friction imparting elements such as a labyrinth seal or a stuffing box with internal packing having an external mounted counterweight. One embodiment is of the power assist type constructed with convenient means for local daily testing the free swing portion of the check valve while another embodiment includes a manual test device. The valves may include friction free disc position indicators.

6 Claims, 11 Drawing Figures

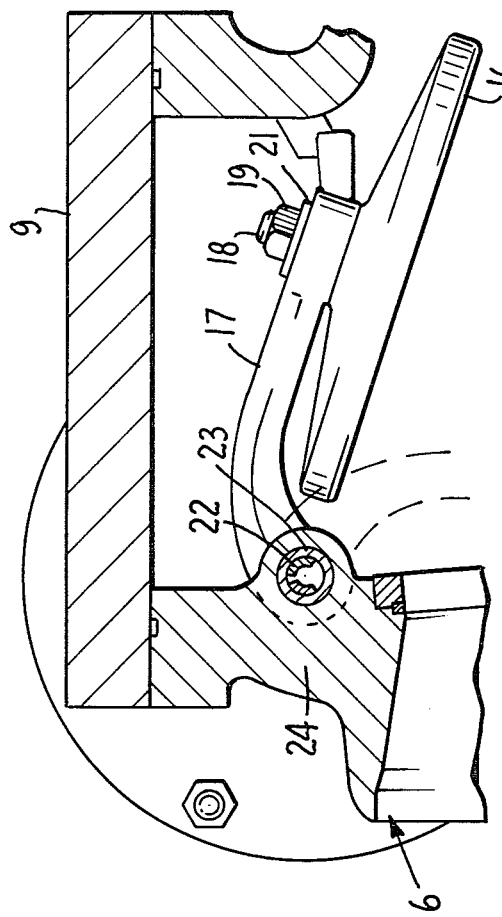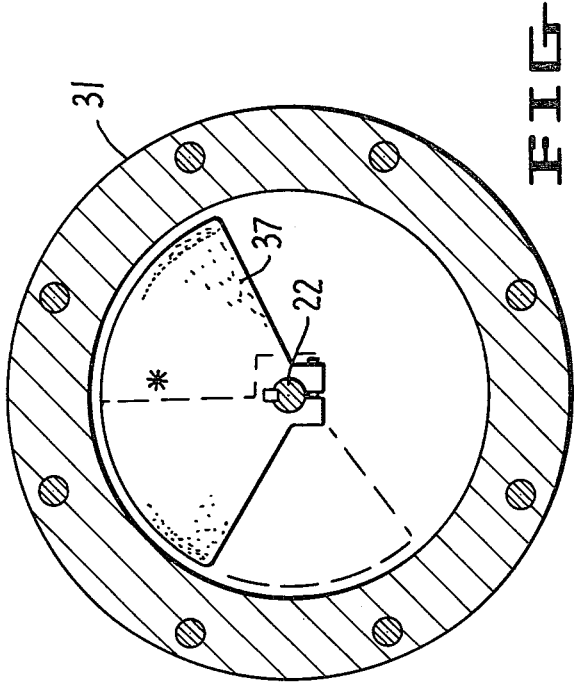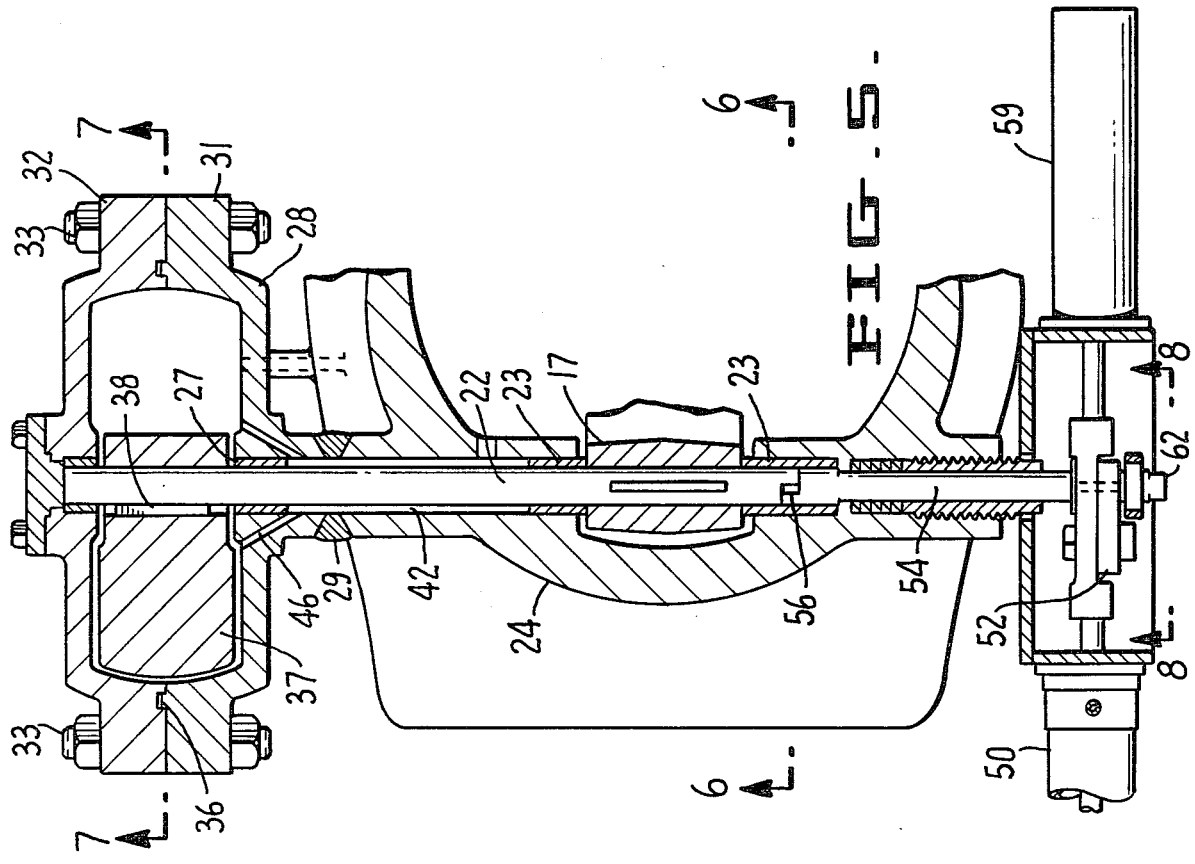

SWING CHECK VALVE WITH INTERNALLY BALANCED DISC

REFERENCE TO RELATED APPLICATION

This application is a continuation-in-part of my application Ser. No. 100,721 filed Dec. 6, 1979, now abandoned.

BACKGROUND OF THE INVENTION

Swing check valves are designed to permit flow in one direction and close automatically when the flow is reversed. Functionally, they prevent back flow in a piping system. The usual check valve is gravity actuated. The weight of the valve initiates the first stage of valve closure while complete shutoff is obtained by the fluid backflow. For each valve size and pressure range there is a minimum differential pressure through the valve at which the flow will be stable. In a case wherein a selected valve is oversized or operating at a very low flow rate, insufficient differential pressure would open the valve disc only partially, resulting in valve fluttering and banging against the valve seat, thus causing a malfunction, noisy operation and premature wear of the moving parts. Conventional check valves are not adequate in systems like steam extraction in thermal power plants and vacuum breakers in nuclear power plants where: (1) flow varies over a wide range; (2) the valve is subject to a low pressure or a low density fluid; or (3) the system requires a high level of protection from overspeeding of a turbine-generator after load rejection or tripout.

Existing construction of steam extraction check valves do not comply with design and operating recommendations to protect or at least minimize damage of large steam turbines. Major concern of engineers, consultants and power companies is that excessive overspeed of a turbine-generator shaft can be disastrous. A second factor almost as important is the energy contained in the feedwater heaters of a steam turbine-generator power cycle is often sufficient to contribute significantly to the magnitude of the turbine-generator rotating speed upon an electrical load rejection or tripout and must be prevented from doing so by means of check valves constructed in accordance with this invention.

SUMMARY OF THE INVENTION

It is in general the broad object of the present invention to provide a check valve construction wherein a counterweight is attached to the operating shaft and is enclosed in a housing which is subject to the pressure of the operating fluid. The operating shaft does not require any seal to maintain it fluid tight while the position and weight of the counterweight can be adjusted to the service requirements. The minimum differential pressure is sufficient to keep the valve in its open position.

Check valves in critical service have five major requirements:
1. Enough capacity to pass the fluid at a maximum flow rate.
2. Stable flow at low flow rates under small differential pressure and low fluid density.
3. Quick response to reverse flow and provide a non-sticky operation.
4. Capability of repeated closure from fully open to fully closed in tenths of a second without causing permanent deformation of the valve that would prevent shutoff of the fluid on reverse flow.
5. Convenient means for local testing that free swinging portion of the check valve is still free to move.

BRIEF DESCRIPTION OF THE DRAWINGS

FIG. 5 is an enlarged section on the line 5—5 of FIG. 4.
FIG. 6 is a section on the line 6—6 of FIG. 5.
FIG. 7 is a section on the line 7—7 of FIG. 5.

DESCRIPTION OF THE PREFERRED EMBODIMENT

Figure 1:
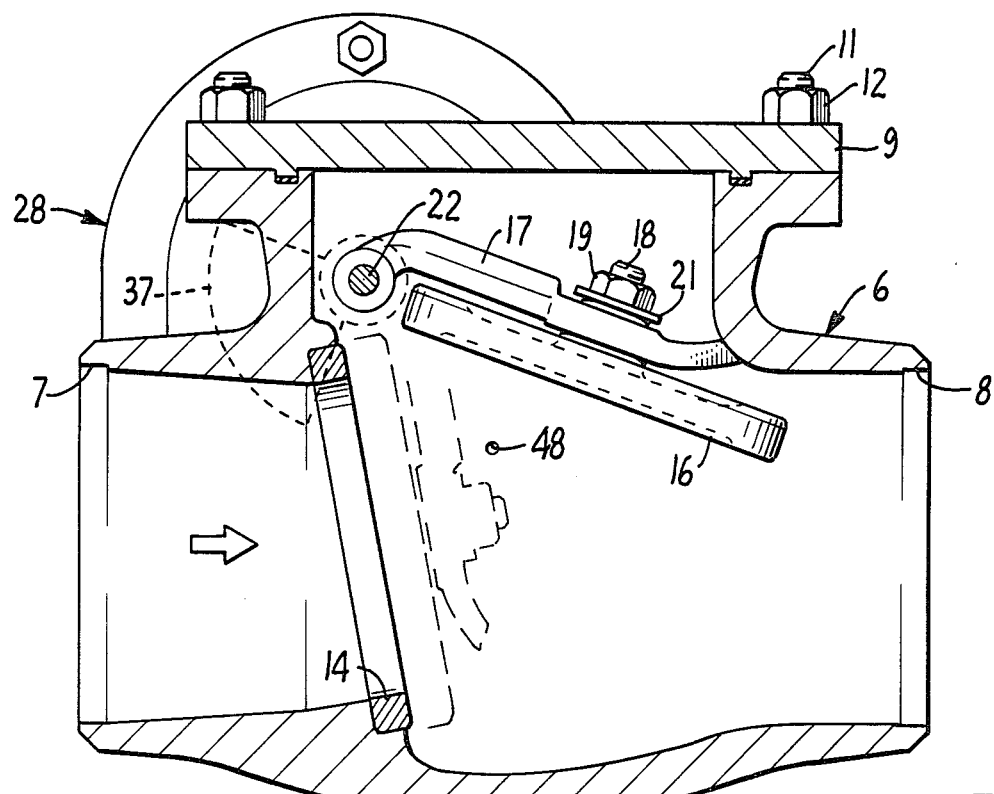
FIG. 1 is a side elevation taken through a check valve embodying the present invention.
Figure 3:
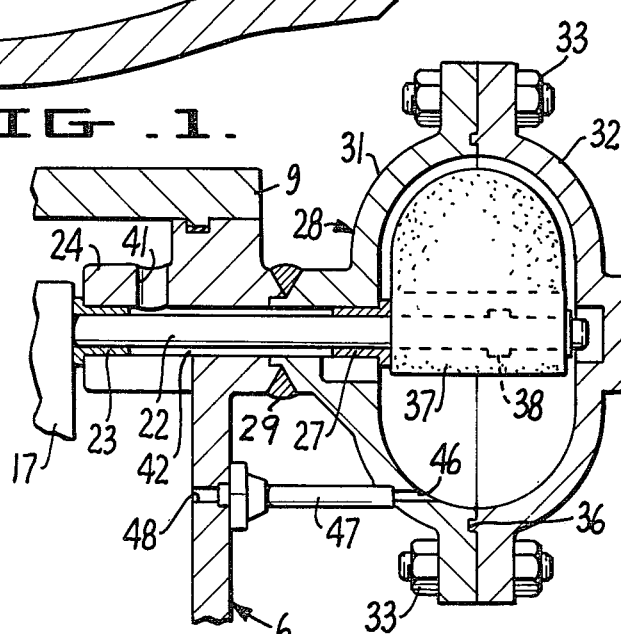
FIG. 3 is a section taken on the line 3—3 in FIG. 2.
Figure 2:
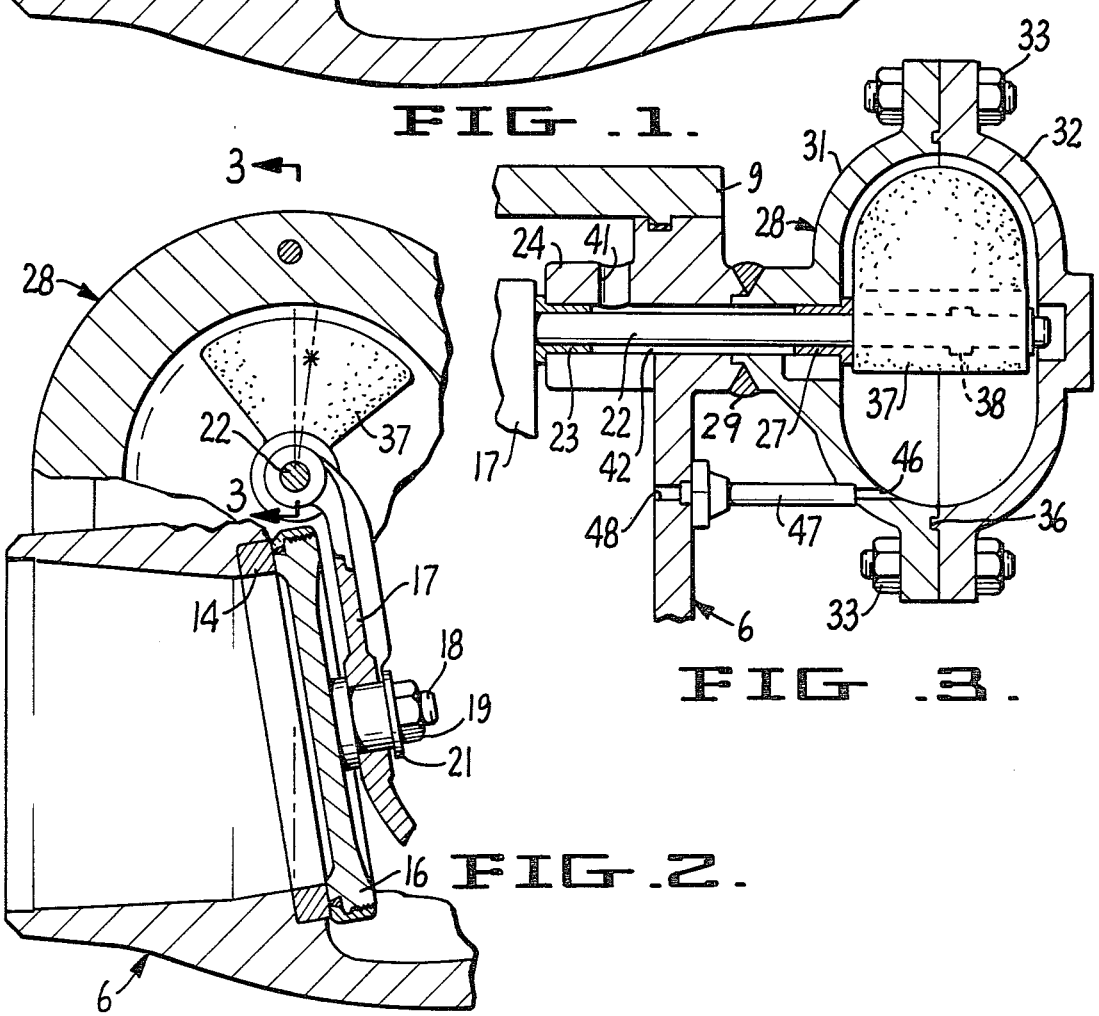
FIG. 2 is a section taken through the check valve and the accompanying counterweight.
Figure 4:
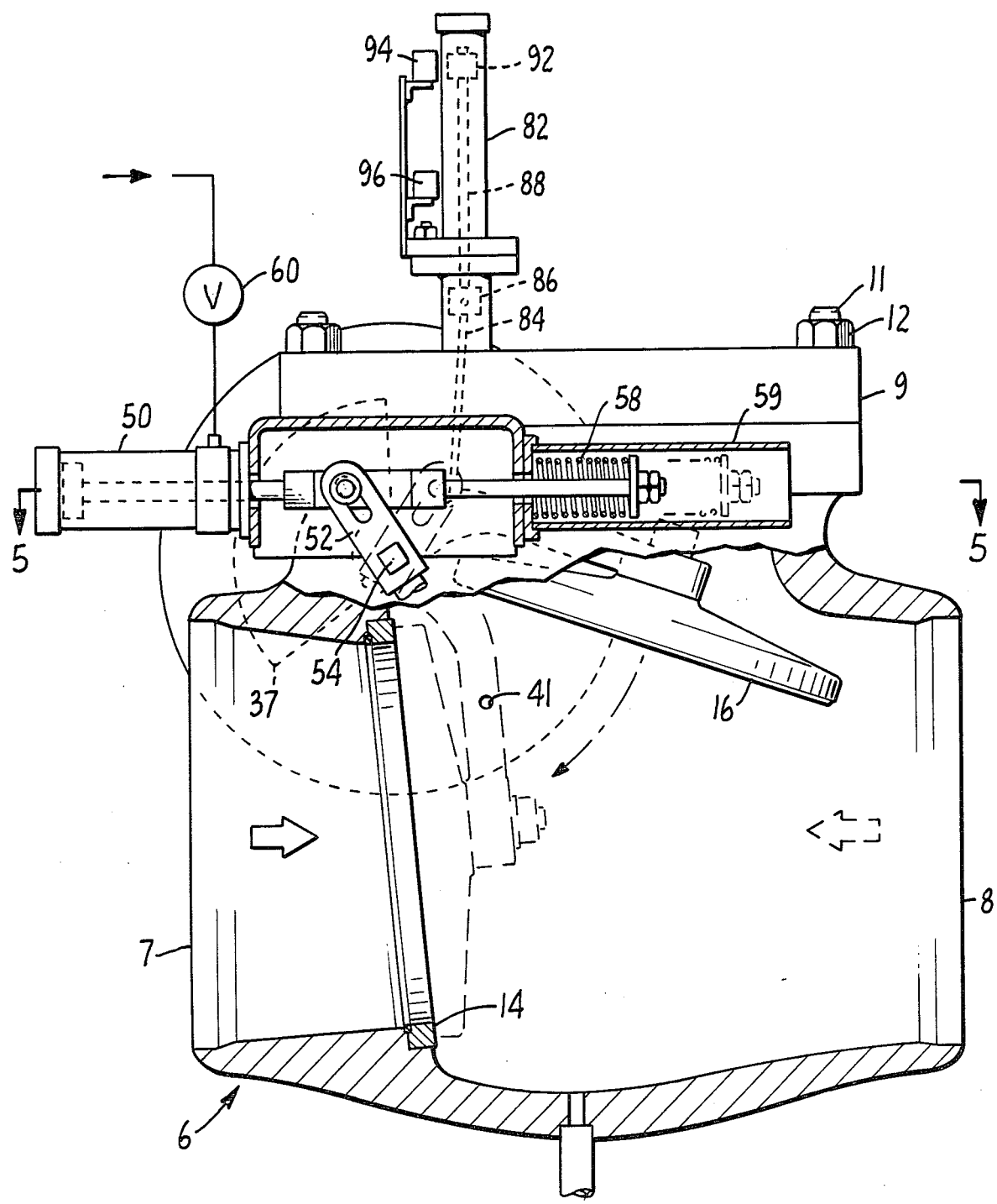
FIG. 4 is a side view, partly in section, of another embodiment of the invention.

Referring to the embodiment shown in FIGS. 1-3, there is shown a valve body 6 having an inlet 7 and an outlet 8. The valve body is closed by cover 9 secured in place by studs 11 and nuts 12 permitting easy access to the body for any suitable purpose. The valve body includes a valve seat 14 provided at an angle of about 10° to the vertical. An annular valve disc 16 is provided to cut off reverse flow between the outlet 8 and the inlet 7. The valve plate 16 is mounted upon a disc arm or disc hinge 17, the plate being supported on the disc arm or disc hinge by stud 18, nut 19 and washer 21. The disc arm or disc hinge 17 is mounted upon a shaft 22 mounted in a bearing 23 provided in wall 24 on the inside of the valve housing 6 and in a bearing 27 mounted on an extension 28 secured as by a weld 29 on the housing 6.

It is a feature of the invention that the bearings 23 and 27 permit the free rotation of shaft 22 unimpeded by any frictional sealing means such as a packing gland.

Housing 28 is made of two parts 31 and 32, joined together by threaded studs and nuts generally indicated at 33. The two parts 31 and 32 have an integral joint 36 so they are sealed one upon the other.

Shaft 22 extends through the housing 28 and carries a counterweight generally indicated at 37 thereon to counterweight the valve plate 16. The counterweight is keyed to the shaft 22 by keys 38. The interior of chamber 28 is in fluid communication with the fluid in the body of the housing by means of fluid conduit 41. The passage 42 about the shaft 22 to the interior of the chamber 28 is in fluid communication with the interior of the valve through the conduit 46, pipe 47 and inlet 48 to drain any condensate into the valve body.

Normally the face of valve seat 14 is provided at an angle of about 10° to the vertical. Counterweight 37 is mounted on shaft 22 so that it is off center by about 5°. Thus, when the valve plate 16 is seated against the face 14, face 14 being at an angle of approximately 10° to the vertical, the counterweight 37 will be in advance of the vertical to provide an effective closing bias on the valve plate.

The embodiment of the invention shown in FIGS. 4–11 embodies the same basic idea as that heretofore described in that it does not require any seal to maintain it fluid tight while the position and weight of the counterweight can be adjusted to the surface requirements. However, the embodiments shown in these figures have the additional feature of providing for an air cylinder actuator for power closure assistance, a provision for a manual disc exercising system and a disc position indicator. Since many of the components are substantially the same as have been previously described, only those elements which differ are described in detail in conjunction with FIGS. 4–11.

Referring now to that embodiment of the invention described in FIGS. 4–11, the power assisted portion of the check valve consists of an air cylinder 50, lever arm 52, actuating shaft 54 with clutch 56 designed such that on tripping the air system by a turbine air relay dump valve, solenoid valve 60 is actuated and vents air from cylinder 50, releasing stored energy of compressed spring 58 in housing 59. This will assist fast closure of the valve disc.

On supplying air to the cylinder 50, the air compresses the spring 58 and allows the check valve to swing freely and to open. It does not restrict the free swing motion of the check valve disc in the closed direction.

To help assure a fast response when the air system is tripped, in a practical embodiment of the invention the air cylinder and spring are sized so that the cylinder connected to the valve, and with no steam flow:

(a) Approximately 30 psig air pressure is sufficient to start piston motion from closed position to opposite end.

(b) Approximately 60 psig air pressure is required to hold the piston against its open end stop.

Provisions for local manual functional testing: the check valve in the extraction system provides overspeed protection and partial water induction protection. The energy contained in the extraction system is capable of adding to the normal turbine overspeed on load rejection if the check valve fails to close. This failure will greatly increase the probability of rotor and bucket damage. Units with high energy in the extraction system, such as those with generators or auxiliary steam connections, are capable of destructive overspeeds. To keep the probability high that the critical check valves will function properly testing is required.

In the past, most failure were caused by binding of the soft compressible, operating shaft packing. Check valves constructed in accordance with this invention do not have this potential drawback, but to satisfy recommendation of turbine-generator manufacturers the following attachments for functional testing may be provided.

Figure 8:
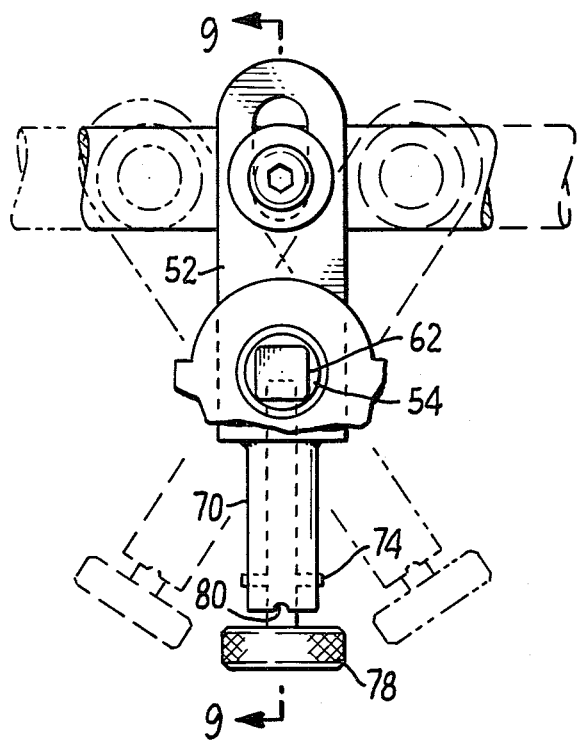
FIG. 8 is an enlarged section on the line 8—8 of FIG. 5.
Figure 9:
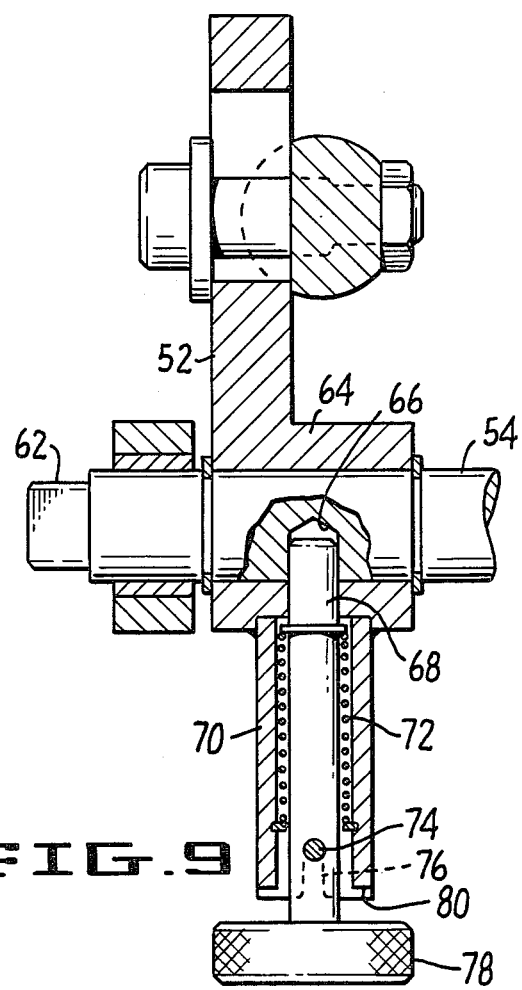
FIG. 9 is an enlarged section on the line 9—9 of FIG. 8.
Figure 10:
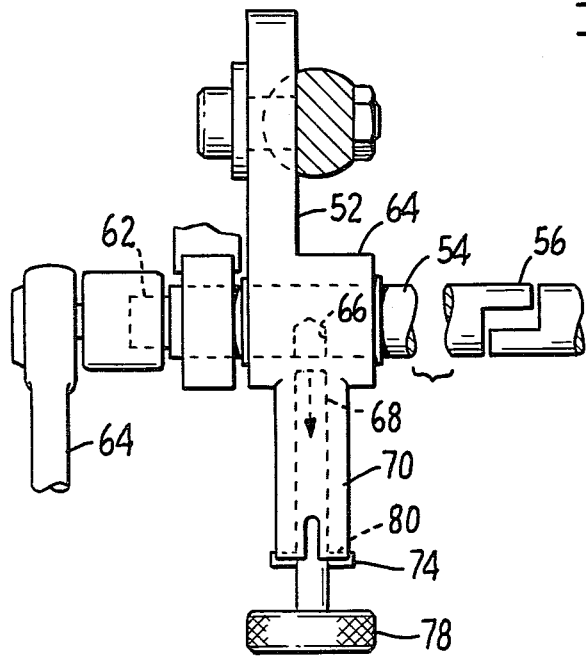
FIG. 10 is an enlarged end view of the structure shown in FIG. 8.
Figure 11:
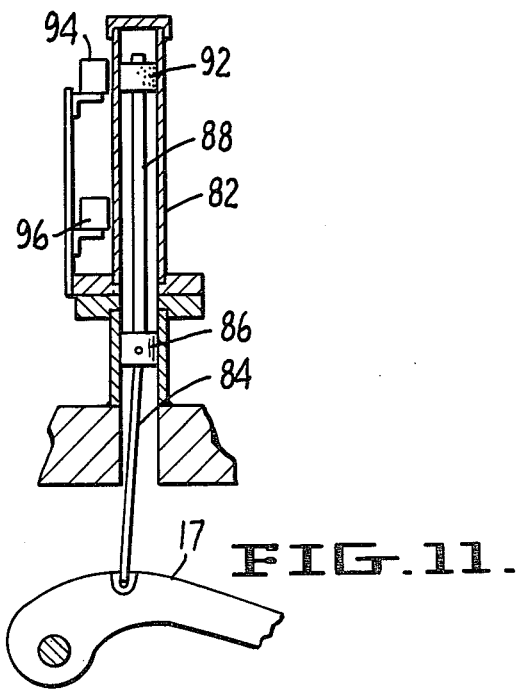
FIG. 11 is a detailed view in section of the magnetic disc position indicator.

In order to provide for the local manual disc exercising, the structure shown in FIGS. 8–10 can be employed. Here shaft 54 is provided with a square end 62 so that it can be turned by the application of a wrench 64. In order to release the air cylinder while the valve is being exercised, a release mechanism is provided between the lever arm 52 and shaft 54. The lever arm 52 terminates in a bearing 64 surrounding shaft 54 and shaft 54 has a hole 66 drilled partially through the shaft while a mating pin 68 is mounted on the bearing 64 so that it can slide through the tubular extension 70. Spring 72 normally urges pin 68 into the hole 66 to engage lever 52 with shaft 54. As is best seen in FIG. 9, pin 68 has a cross pin 74 which fits into a notch 76. Now, if one wishes to manually exercise the valve, one pulls out on knob 78 until pin 74 is clear of tube 70 and gives the knob a quarter turn and pin 74 is now held on lip 80. In this position, the air actuator is disengaged and the shaft 54 can be turned freely with the wrench 64. On the other hand, if the pin 68 is in as is shown in FIGS. 8 and 9, the air actuator is operative so that movement of the lever arm 52 now moves the shaft 54 as is shown in phantom in FIG. 8.

It is frequently desirable to have a remote indicator to show whether the valve is open or closed. For this purpose, the disc position indicator shown in FIGS. 4 and 11 may be employed. A cylinder is provided which is located above the arm 17 which carries the valve disc. This cylinder 82 is made of a non-magnetic material such as aluminum or stainless steel. A connecting rod 84 connects arm 17 and a piston 86 to which is attached a shaft 88. Shaft 88 carries a magnet 92 and reed switches 94 and 96 are connected near the top and the bottom of tube 82 so that the position of the magnet 92 can be detected. Normally the reed switches 94 and 96 would be connected by suitable wiring to an indicating device, not illustrated.

I claim:

1. A check valve comprising:
   a valve body having an inlet and an outlet;
   a valve seat in said body and disposed at a first angle with respect to vertical to be upwardly inclined toward said inlet;
   a shaft rotatably mounted in said body adjacent said valve seat, said shaft having one end thereof extending out of said valve body;
   a valve disc fixedly mounted on another end of said shaft for rotation therewith, said valve disc being located in said valve body to seat on said valve seat to interrupt fluid flow between said inlet and said outlet;
   a housing mounted on said valve body and receiving therein said shaft one end;
   fluid passage means fluidly connecting the interior of said valve body with the interior of said housing for draining condensate into said valve body, said fluid passage means including a conduit in which said shaft is located; and
   a counterweight fixedly mounted on said shaft one end for rotation therewith and located in said housing, said counterweight being mounted on said shaft one end off center of said counterweight by a second angle which is less than said first angle so that when said valve disc is seated against said valve seat said counterweight is in advance of vertical with respect to flow direction through said valve body to provide a closing bias on said valve disc.

2. A check valve comprising:
   a valve body having an inlet and an outlet;
   a valve seat in said body and disposed at a first angle with respect to vertical to be upwardly inclined toward said inlet;
   a shaft rotatably mounted in said body adjacent said valve seat, said shaft having one end thereof extending out of said valve body;
   a valve disc fixedly mounted on another end of said shaft for rotation therewith, said valve disc being located in said valve body to seat on said valve seat to interrupt fluid flow between said inlet and said outlet;

a housing mounted on said valve body and receiving therein said shaft one end;

first fluid passage means fluidly connecting the interior of said valve body with the interior of said housing, said first fluid passage means including a conduit in which said shaft is located;

second fluid passage means spaced from said first fluid passage means and fluidly connecting the interior of said valve body with the interior of said housing for draining condensate into said valve body; and a counterweight fixedly mounted on said shaft one end for rotation therewith and located in said housing, said counterweight being mounted on said shaft one end off center of said counterweight by a second angle which is less than said first angle so that when said valve disc is seated against said valve seat said counterweight is in advance of vertical with respect to flow direction through said valve body to provide a closing bias on said valve disc.

3. A check valve in accordance with claim 1 having the following additional structure:

a lever arm mounted on said shaft;

an air cylinder adapted to actuate said lever arm;

a compression spring attached to said lever arm whereby application of air pressure to said air cylinder will move said lever arm and compress said spring.

4. The structure of claim 3 having a lost motion clutch between said lever arm and said shaft.

5. The structure of claim 3 having a release mechanism between said lever arm and said shaft whereby said lever arm can be released, allowing said shaft to rotate independent of said lever arm.

6. The structure of claim 1 having a valve disc position indicator comprising magnet means, means for moving said magnet means from a first position to a second position depending upon the position of said valve disc and magnet detecting means located substantially at the ends of the path of travel of said magnet means.

* * * * *